3,297,619
ANTIOXIDANT EMULSIONS PREPARED FROM TWO-PHASE SYSTEMS
John W. Bluhm, Vienna, and James R. Tucker, Parkersburg, W. Va., assignors to Borg-Warner Corporation, Chicago, Ill., a corporation of Illinois
No Drawing. Filed June 5, 1964, Ser. No. 373,034
8 Claims. (Cl. 260—29.6)

This invention relates to antioxidant emulsions and more particularly to low foaming antioxidant emulsions for use in carboxylic modified styrene-butadiene rubber latices.

Prior to this invention, it was common practice to add an antioxidant emulsion to styrene-butadiene rubber latices (GRS type rubber) during the compounding of these latices prior to shipment. The antioxidant was added for the purpose of retarding oxidation and resultant deterioration. Antioxidant emulsions normally added to the carboxylic SBR latices such as the caseinate type had a tendency to discolor the latex as well as to increase processing difficulties. Processing difficulties resulted due to excessive foaming of the latices during agitation and blending of the compounding ingredients.

In accordance with the present invention, an antioxidant emulsion is prepared which may be added to the carboxylic SBR latices without causing aging discoloration or excessive foaming of the latex.

The antioxidant emulsion prepared in accordance with this invention is comprised of an antioxidant, an organic solvent, a thickener, and water. An emulsifier may be added though it is not considered an essential ingredient.

The antioxidant of the antioxidant emulsion utilized in this invention is present in a range of from about 10 parts by weight to about 40 parts by weight of the total weight of the emulsion. The specific antioxidant may be a substituted phenol such as styrenated phenol, an aromatic amine, or a substituted aromatic amine such as a substituted phenylene diamine.

The organic solvent utilized, of necessity, must be a type that will dissolve or dilute the antioxidant. The solvent is preferably an aromatic solvent, e.g., benzene, xylene, toluene; a cycloaliphatic solvent, e.g., cyclohexane; or aliphatic solvent, e.g., butyl alcohol. The solvent is ordinarily present in a range from about 2 parts by weight to about 35 parts by weight of the total weight of the antioxidant emulsion.

The thickening agent is added as a 5 percent solution and is present in from about 2 to about 10 parts by weight of the total weight of the antioxidant emulsion. The thickening agent is preferably a polymeric acrylic salt such as sodium polyacrylate, though ammonium and potassium polyacrylate are equally operable.

As mentioned, the use of an emulsifier is optional. When an emulsifier is used, it is added in an amount up to 10 parts by weight of the total weight of the antioxidant emulsion. Such compounds as a water soluble alkyl phenol of polyethylene glycol or alkyl phenol-ethylene oxide condensation products are operable.

The following is an exemplary procedure utilized in making antioxidant emulsions of this invention. The antioxidant is added to the organic solvent and if an emulsifier is to be added, one-half of it is also added to the antioxidant solvent solution. The solvent should not exceed 50 percent by weight of the total weight of the antioxidant emulsion. The mixture is agitated to mix and disperse the ingredients. The other half of the emulsifier is dissolved in the water and the thickener is added thereto. The solvent solution and water solution are combined under continuous agitation.

The following examples will serve to illustrate the variations of the components making up the antioxidant emulsions.

*Example I*

Utilizing the procedure above set forth, 10 parts of styrenated phenol are dissolved in about two parts of xylene. Two parts of five percent sodium polyacrylate solutions are mixed with water and added to the organic solution. When this antioxidant emulsion is added to a carboxylic SBR latex, 40 percent less foam is exhibited than is exhibited by a caseinate antioxidant emulsion, i.e., where ammonium caseinate is used in place of sodium polyacrylate. The emulsion does not discolor and remains stable upon aging.

*Example II*

35 parts of styrenated phenol are dissolved in 7.5 parts of xylene. 7.5 parts of a 5 percent solution of sodium polyacrylate are mixed with water and added to the solution. There is a substantial reduction in foaming tendencies of the latex upon addition to the antioxidant emulsion. The foam decreases in the order of about 35 percent from that of foaming caused by an antioxidant emulsion utilizing ammonium caseinate in place of the sodium polyacrylate. The antioxidant emulsion does not discolor or lose stability due to aging.

*Example III*

Forty parts of styrenated phenol are dissolved in about eight parts of cyclohexane. About five parts of a nonionic nonylphenoxypolyethyleneoxy) ethanol are added to the solvent solution. Five parts nonylphenoxypoly (ethyleneoxy) ethanol along with 7.5 parts potassium polyacrylate are mixed with water and added to the solvent solution. There is a substantial reduction of foaming tendencies, i.e., in the order of about 30 percent reduction, when the antioxidant emulsion is added to a carboxylic modified SBR latex in place of an antioxidant emulsion containing caseinate. The antioxidant does not discolor or lose stability due to aging.

In the above examples, the water was added in a sufficient amount to make up 100 parts by weight emulsion.

It will be noted that the antioxidant may be varied over a wide range, i.e., from 10 to 40 parts by weight of antioxidant to from 2 to 35 parts by weight of organic solvent to make up the organic solvent phase of the antioxidant emulsion. The organic solvent phase of the antioxidant emulsion should not, however, exceed 50 percent by weight of the total antioxidant emulsion.

The water phase may contain as much as 88 percent by weight of the total water-solvent phase of the antioxidant emulsion solution. The water phase contains from 0 to about 5 parts by weight of emulsifier (i.e., one-half of the total emulsifier added), 2 to 10 parts by weight of a 5 percent solution of thickener such as sodium, ammonium, or potassium polyacrylate combined with the water. The parts by weight of the water phase is not critical as are the total parts by weight of the organic solvent phase in the antioxidant emulsion.

It should be understood that this invention has been described in connection with certain specific embodiments by way of illustration and not limitation. The scope of this invention is defined solely by the appended claims which should be construed as broadly as is consistent with the prior art.

What is claimed is:
1. In the compounding of a carboxylic SBR latex, the step of adding to said latex an antioxidant emulsion comprised of:
an organic phase containing up to 50 percent of the total weight of the antioxidant emulsion, which phase contains 10 to 40 parts by weight of an antioxidant dissolved in from 2 to 35 parts by weight of an organic solvent,
a water phase which contains 2 to 10 parts by weight of a 5 percent solution of polyacrylate selected from the group consisting of sodium, ammonium, and potassium polyacrylate, and
86 to 15 parts by weight of water, said parts by weight referring to the total weight of the antioxidant emulsion.

2. In the compounding of a carboxylic SBR latex, the step of adding to said latex an antioxidant emulsion comprised of:
10 to 40 parts by weight of an antioxidant dissolved in from 2 to 35 parts by weight of an organic solvent,
2 to 10 parts by weight of a polyacrylate selected from the group consisting of sodium, ammonium, and potassium polyacrylate,
from 2 to 15 parts by weight of an emulsifier selected from the group consisting of substituted phenols and substituted glycols, and
86 to 15 parts by weight of water, said organic solvent, antioxidant, and one half of said emulsifier comprising less than 50 percent of the total weight of said antioxidant emulsion.

3. An antioxidant emulsion comprised of:
10 to 40 parts by weight of an antioxidant selected from the group consisting of substituted phenols and substituted aromatic amines dissolved in 2 to 35 parts by weight of an organic solvent,
2 to 10 parts by weight of a polyacrylate selected from the group consisting of sodium, ammonium, and potassium polyacrylate, and
86 to 15 parts by weight of water,
said antioxidant and organic solvent comprising less than 50 percent of the total weight of said antioxidant emulsion.

4. An antioxidant emulsion comprised of:
10 to 40 parts by weight of an antioxidant selected from the group consisting of substituted phenols and substituted aromatic amines dissolved in 2 to 35 parts by weight of an organic solvent,
2 to 10 parts by weight of a polyacrylate selected from the group consisting of sodium, ammonium, and potassium polyacrylate,
2 to 15 parts by weight of an emulsifier selected from the group consisting of an alkyl substituted phenol and alkyl substituted glycols, and
86 to 15 parts by weight of water,
said antioxidant and organic solvent comprising less than 50 percent of the total weight of said antioxidant emulsion.

5. An antioxidant emulsion comprised of:
about 35 parts by weight of an antioxidant dissolved in about 7.5 parts by weight of an organic solvent and about 7.5 parts by weight of a five percent solution of sodium polyacrylate, and about 40 parts by weight of water.

6. An antioxidant emulsion comprised of:
about 35 parts by weight of an antioxidant dissolved in about 7.5 parts by weight of an organic solvent,
about 7.5 parts by weight of a five percent solution of sodium polyacrylate,
about 10 parts by weight of an alkyl phenol ether of polyethylene glycol, and
about 40 parts by weight of water.

7. A low foaming antioxidant emulsion for use with carboxylic SBR latices comprising:
from about 10 to about 40 parts by weight of an antioxidant dissolved in from about 2 to about 35 parts by weight of an organic solvent,
about 2 to about 10 parts by weight of a five percent solution of a polyacrylate selected from the group consisting of sodium, ammonium, and potassium polyacrylate, and
about 86 to about 15 parts by weight of water,
said antioxidant and organic solvent comprising less than 50 percent of the total weight of said antioxidant emulsion.

8. A low foaming antioxidant emulsion for use with carboxylic SBR latices, said emulsion comprising:
from 10 to 40 parts by weight of an antioxidant selected from the group consisting of substituted phenols and substituted aromatic amines dissolved in from 2 to 35 parts by weight of an organic solvent,
2 to 10 parts by weight of a five percent solution of a polyacrylate selected from the group consisting of sodium, ammonium, and potassium polyacrylate,
from 2 to 15 parts by weight of an emulsifier selected from the group consisting of substituted phenols and substituted glycols, and
86 to 15 parts by weight of water,
said antioxidant and organic solvent comprising less than 50 percent of the total weight of said antioxidant emulsion.

References Cited by the Examiner

UNITED STATES PATENTS 3,115,465  12/1963  Orloff et al. _____ 260—45.95

FOREIGN PATENTS 940,364  10/1963  Great Britain.

MURRAY TILLMAN, *Primary Examiner.*

W. J. BRIGGS, Sr., *Assistant Examiner.*